(12) United States Patent
Simon

(10) Patent No.: US 11,126,951 B2
(45) Date of Patent: Sep. 21, 2021

(54) SYSTEM AND METHOD FOR SCREENING DELIVERIES TO TRADE SHOWS

(71) Applicant: United Service Companies, Chicago, IL (US)

(72) Inventor: Richard A. Simon, Chicago, IL (US)

(73) Assignee: UNITED SERVICE COMPANIES, Chicago, IL (US)

(*) Notice: Subject to any disclaimer, the term of this patent is extended or adjusted under 35 U.S.C. 154(b) by 650 days.

(21) Appl. No.: 16/047,887

(22) Filed: Jul. 27, 2018

(65) Prior Publication Data

US 2019/0034869 A1 Jan. 31, 2019

Related U.S. Application Data

(60) Provisional application No. 62/537,078, filed on Jul. 26, 2017.

(51) Int. Cl.
*G06Q 10/08* (2012.01)
*G06K 7/14* (2006.01)
*G06Q 50/26* (2012.01)

(52) U.S. Cl.
CPC ....... *G06Q 10/0832* (2013.01); *G06K 7/1413* (2013.01); *G06K 7/1417* (2013.01); *G06Q 50/26* (2013.01)

(58) Field of Classification Search
CPC .. G06Q 10/0832; G06Q 50/26; G06K 7/1413; G06K 7/1417
See application file for complete search history.

(56) References Cited

U.S. PATENT DOCUMENTS

2017/0061372 A1* 3/2017 Agarwal ............... G06Q 20/42
2019/0354931 A1* 11/2019 Amato ............... G06Q 10/0838

* cited by examiner

*Primary Examiner* — Laura A Gudorf
(74) *Attorney, Agent, or Firm* — Baker & McKenzie LLP

(57) ABSTRACT

A system and method for ensuring safe delivery of items to an event, such as a conference or trade show. The system uses a controlled-access website or app and a program with a database operated by a security coordinator. All prospective attendees are vetted, and after being verified as bona fide attendees who qualify as a reliable exhibitor/shipper, are given access to the database for the purpose of obtaining (by download) a particularized set of coded labels to be applied to a particular item to be shipped. The coded labels are then printed, applied to the items to be shipped and sent to a staging location for screening. At the staging location, the security coordinator scans all coded labels of shipped items when they arrive, and the program compares the scanned data with the data in the database to see if the shipped items are associated with a reliable exhibitor/shipper. If there is a match, the shipped items can then be forwarded to the event, and if the shipped item does not bear a coded label that is associated with a reliable exhibitor/shipper, the item is moved to a remote location for further investigation.

6 Claims, 3 Drawing Sheets

SYSTEM AND METHOD FOR SCREENING DELIVERIES TO TRADE SHOWS

This application is based on and claims priority to U.S. Provisional Patent Application Ser. No. 62/537,078, which was filed on Jul. 26, 2017, and which is incorporated herein by reference.

This invention relates to a system and method for making it more difficult for unauthorized parties to deliver unwanted material, such as bombs, to trade shows, conferences and other business gatherings.

BACKGROUND AND SUMMARY OF THE INVENTION

Trade shows and conferences are important gatherings which draw tens of thousands of business people from about the world to promote and transact business. Such gatherings are significant targets for terrorist activity. A terrorist attack at a trade show could have devastating effects, not only with regard to personal injuries and deaths of those operating and attending the show, but on the business climate and the economy, in general. Thus, it is goal of this invention to prevent terrorist attacks at trade shows, conferences and similar gatherings. Large trade shows are particularly susceptible to terrorist attacks through the shipment of nefarious material, because there are large numbers of items sent to such shows, which increases the chance that a shipment might pass unnoticed.

In the context of a trade show, practice of the invention described herein starts with a security coordinator obtaining from the show organizer a list of contact information for exhibitors who plan to attend the trade show. Preferably, the list will have been carefully vetted to ensure that the list includes only bona fide exhibitors, and that the contact information is reliable and pertains to persons who are authorized by a vetted exhibitor to be responsible for shipping material to the trade show, i.e., a trusted exhibitor contact person. Once the list has been obtained, the security coordinator creates a database of trusted exhibitor contact persons, and those persons are contacted by the security coordinator, given the address or download information for the website or app. The security coordinator also informs each trusted exhibitor contact person that they must obtain customized coded shipping labels for all items to be delivered to the trade show, and that no shipments will be allowed into the trade show without a customized coded shipping label issued by the security coordinator. When the trusted exhibitor contact person logs into the website or app set up by the security coordinator, the security coordinator authenticates the name of the trusted exhibitor contact person attempting to log into the secure shipping system by comparing the login details associated with the login attempt with the contact information initially provided to the security coordinator by the show organizer to ensure that only trusted exhibitor contact persons have access to the website or app of the security coordinator. The security coordinator may have several events being controlled at once, so the user must also identify the trade show or event to which the trusted exhibitor contact person is seeking to ship material. Once the user has been authenticated and the event selected, the coded labels are able to be downloaded exclusively from the secure website and/or an app controlled by the security coordinator. The website or app instructs the trusted exhibitor contact person to download and print a set of coded labels for each item, such as a box, wrapped pallet or other unitary container, and that there should be a coded label on each exposed side of the container.

The trusted exhibitor contact person then downloads and prints as many sets of coded labels as are needed and affixes the coded labels, one per exposed side, to the package, pallet or other container. The shipped item is sent to a secure location, i.e., an event warehouse that is under the control of the security coordinator. Upon arrival at the event warehouse, the security coordinator scans each of the coded labels on each shipped item, and verifies that the shipped item is from a trusted exhibitor contact person. If the coded label is valid, i.e., one issued by the security coordinator to the trusted exhibitor contact person associated with the shipped item, then the particular coded label used for the particular shipped item is annulled to prevent any further use of that coded label. If the coded label does not match with any authorized coded label, or if the shipped item contains no coded label at all, the shipped item is deemed suspect and subjected to a security protocol. The security protocol will entail moving the suspect item to a secure area, which may be a bomb-proof location remote from the event and away from populated areas, so that further investigation of the suspect shipped item can be carried out without danger to persons or property.

FIGURES

Features and advantages of the invention will become apparent in the detailed description drawings, read in conjunction with the accompanying drawings.

DETAILED DESCRIPTION OF THE INVENTION

Figure 1:
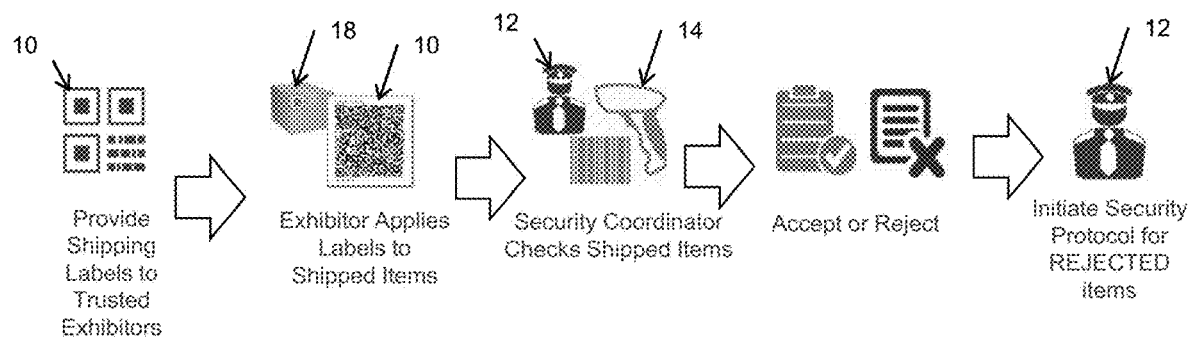
FIG. 1 is a flow chart describing, in general, the invention.
Figure 2:
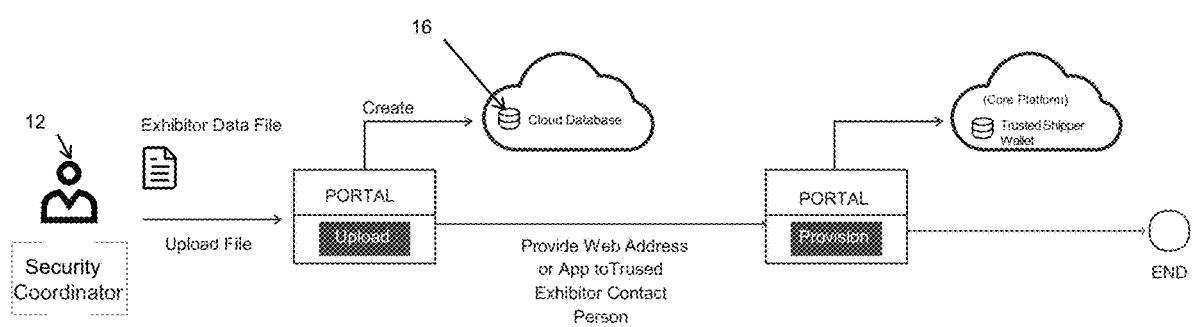
FIG. 2 is a flow chart describing the security coordinator's setup of a system embodying the present invention.

FIGS. 1 and 2 shows the broad aspects of the invention, which include providing coded labels to exhibitor; the exhibitor applying the coded labels; reading and verifying the coded labels when they arrive at a staging area; and accepting or rejecting a shipment based on comparison of the coded label to the security coordinator's database 16. It is preferred that the exhibitors be vetted and verified as reliable sources for the shipment of items 18 to be used at a trade show or conference. Vetting will preferably require two forms of verification (i.e. a two-factor authentication) in order for an exhibitor or exhibitor's agent to qualify as Trusted Shipper™. A security coordinator 12 issues the coded labels 10 and makes them available for downloading from a website or an app maintained by the security coordinator. As shipments arrive, preferably at an offsite staging location near the event location, but at a safe distance away from the event location, the security coordinator checks each shipped item 18 by scanning the coded labels 10 on each exposed side of a given shipment and checking the codes on the coded labels against the system database 16. If the code matches with one issued to a Trusted Shipper™, then an "accept" signal is sent to the handheld reader 14, and the shipment is scheduled for transfer of the shipped and accepted item to the event location. If any one scanned code is found not to match with a Trusted Shipper™, the shipped item 18 is rejected and immediately removed to a safe location for further investigation. The safe location is preferably a remote bomb-proof and otherwise contained location away from the event location and away from the offsite staging location, so that any explosive or other dangerous material will be contained and do minimal harm.

Preferably the coded labels 10 have encoded QR codes, so they can be read at the receiving end of a shipment by a security coordinator 12 using a handheld reader 14. Bar codes may be used in lieu of QR codes. Once a shipper has been verified as a Trusted Shipper™, such as a bona fide exhibitor or an agent working for a bona fide exhibitor, the Trusted Shipper™ will be allowed to download coded labels made available on a secure website or app by the security coordinator 12.

Based on data from a trade show or conference organizer, the security coordinator creates a database 16 of Trusted Shippers™, and those persons are contacted by the security coordinator 12, given the address or download information for website or app. As an added level of security, the security coordinator 12 may require that any exhibitor must contact the security coordinator 12 by phone, so that caller ID may be used to verify the identify of the exhibitor or exhibitor's agent, before information is provided that will allow the exhibitor to download the coded labels 10 that will allow shipments to reach the trade show floor. Once an exhibitor has been vetted and verified, and becomes a Trusted Shipper™, the security coordinator 12 will then inform that Trusted Shipper™ that they may obtain customized shipping coded labels 10 for all items to be delivered to the trade show. Only Trusted Shippers™ will have access to coded labels 10 that will pass through the screening performed by the security coordinator 12. Each Trusted Shipper™ will also be informed that no shipments will be allowed into the trade show without a customized shipping coded label 10 issued by the security coordinator 12. When the Trusted Shipper™ logs into the website or app set up by the security coordinator 12 authenticates the name of the Trusted Shipper™ attempting to log into the secure shipping system by comparing the login details associated with the login attempt with the contact information initially provided to the security coordinator 12 by the show organizer to ensure that only a Trusted Shippers™ have access to the website or app of the security coordinator 12. The security coordinator 12 may have several events being controlled at once, so the user must also identify the trade show or event to which the Trusted Shipper™ is seeking to ship material. The information in the database 16 must match the information being entered by the Trusted Shipper™ in order for the coded labels to be downloaded. The security coordinator 12, via the website or app, enables the Trusted Shipper™ to download and print a set of coded labels 10 for each item 18, which may be, for example, a box, crate, wrapped pallet or other unitary container. The security coordinator 12 informs the Trusted Shipper™ that there should be a coded label 10 on each exposed side of the container. Once the Trusted Shipper™ has downloaded and printed sufficient sets of coded labels and affixes the coded labels 10, one per exposed side of the package, pallet or other container, the items are ready for shipment to the offsite staging area.

Figure 3:
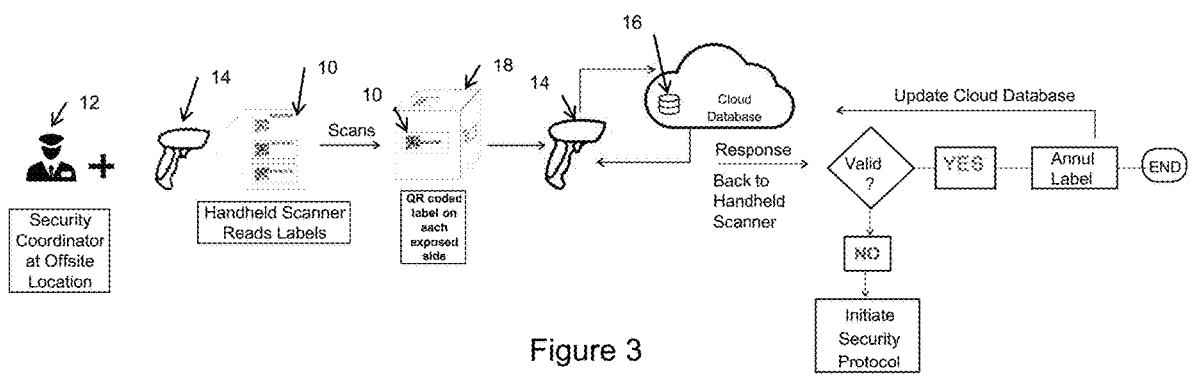
FIG. 3 is a flow chart showing the steps that are taken by a security coordinator in implementing and using a system of the present invention.

As show in FIG. 3, the shipped items arrive at a secure location, i.e., an event warehouse that is under the control of the security coordinator 12. Upon arrival at the event warehouse, the security coordinator 12 scans each of the coded labels on each shipped item, and verifies that the shipped item is from a trusted exhibitor contact person. If the coded label 10 is valid, i.e., one issued by the security coordinator 12 to Trusted Shipper™ associated with the shipped item 18, then the particular coded label 10 used for the particular shipped item 18 is annulled to prevent any further use of that coded label 10. If the coded label 10 does not match with any authorized code, or if the shipped item 18 contains no coded label at all, the shipped item 18 is deemed suspect and subjected to a security protocol. The security protocol will entail moving the suspect item to a secure area, which is preferably a bomb-proof location remote from the event and away from populated areas, including away from the offsite staging area, so that further investigation of the suspect shipped item can be carried out without danger to persons or property.

The database 16 is preferably part of and accessible by a program on a computer controlled by the security coordinator 16. The program will be installed on a computer and will be designed to compare data read by the handheld scanner 14 with data in the database 16 listing Trusted Shippers™ to verify that scanned data from the handheld scanner 14 matches with data in the database. In addition, the program is preferably capable of sending to the handheld scanner 14 an "accept" message when a match is found and a "reject" message when no match is found.

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., handheld readers, databases, computers, servers apps and the like) shown as distinct for purposes of illustration may be incorporated within other functional elements, separated in different hardware, or distributed in a particular implementation. While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

The invention claimed is:

1. A system for screening deliveries of a shipped item to an event comprising:
a database of reliable exhibitors/shippers who plan to attend the event, a controlled-access source where a reliable exhibitor may obtain coded labels for download and application to a shipped item, the database associating a particular set of coded labels with a particular item to be shipped by one of the reliable exhibitor/shippers, a handheld scanner capable of reading the coded labels on a shipped item, a program for comparing data read by the handheld scanner with data in the database of reliable exhibitor/shippers and for verifying that scanned data from the handheld scanner matches with data in the database, the program capable of sending to the handheld scanner an accept message when a match is found and a reject message when no match is found, and a remote safe location for receiving rejected shipped items.

2. A system in accordance with claim 1 wherein each of the coded labels contains at least one code selected from the group consisting of a QR code and a bar code.

3. A system in accordance with claim 2 wherein the program annuls the coded label after the coded label has been verified.

4. A system in accordance with claim 3 wherein the event is one selected from the group consisting of: a trade show and a conference.

5. A system in accordance with claim 4 wherein the controlled-access source is selected from the group consisting of a website and an app.

6. A method for screening deliveries of a shipped item to an event comprising:

creating a database of reliable exhibitors/shippers that have indicated an intention to attend the event, establishing a controlled-access source from which a reliable exhibitor/shipper may obtain via a download a particularized set of coded labels for use on a particular item to be shipped, and associating in the database the particularized set of coded labels with a particular reliable exhibitor/shipper who downloaded the particularized set of coded labels, instructing the reliable exhibitor/shipper to send an item to be shipped to a staging location associated with the event, providing a handheld scanner to a security coordinator at the staging location, upon receipt of an item shipped at the staging location, scanning the shipped item to obtain scanned data relating to the shipped item, and comparing the scanned data to information in the database to verify that the coded label is one that was downloaded by a reliable exhibitor/shipper, and if the coded label on a shipped item matches with data in the database allowing the shipped item to be delivered to the event, and if the coded label on a shipped item does not match with data in the database transferring the shipped item to a secure area for further investigation.

\* \* \* \* \*